J. L. MILLER & J. E. HINE.
DEVICE FOR OPERATING VESTIBULE DOORS AND TRAPS.
APPLICATION FILED MAR. 9, 1911.
995,889.
Patented June 20, 1911.
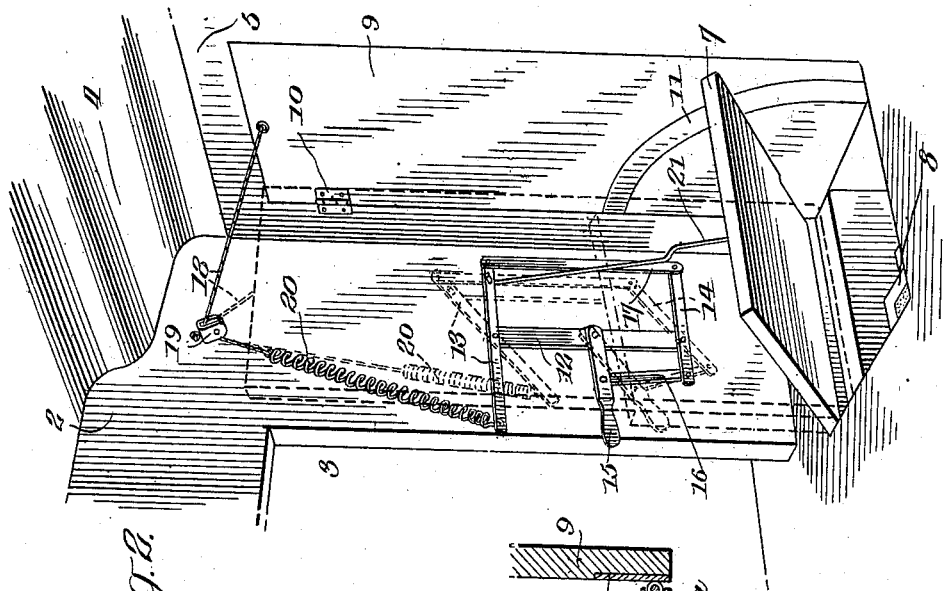
WITNESSES:
Samuel E. Wade
L. A. Stanley
INVENTOR
JAMES L. MILLER
JOHN E. HINE
BY Munn & Co.
ATTORNEYS

UNITED STATES PATENT OFFICE.

JAMES L. MILLER AND JOHN E. HINE, OF MONTGOMERY, PENNSYLVANIA.

DEVICE FOR OPERATING VESTIBULE DOORS AND TRAPS.

995,889.  Specification of Letters Patent.  Patented June 20, 1911.

Application filed March 9, 1911. Serial No. 613,244.

*To all whom it may concern:*

Be it known that we, JAMES L. MILLER and JOHN E. HINE, citizens of the United States, and residents of Montgomery, county of Lycoming, and State of Pennsylvania, have invented certain new and useful Improvements in Devices for Operating Vestibule Doors and Traps, of which the following is a specification.

Our invention relates to devices for operating doors and traps, particularly those of the vestibules of passenger cars, and it consists in the combinations, constructions and arrangements herein described and claimed.

An object of our invention is to provide a device by means of which the trap and door of a vestibule may be opened or closed by a single movement.

A further object of our invention is to provide a device of simple construction for operating doors and traps which is strong and durable and which is not liable to get out of order.

A further object of our invention is to provide a device for opening or closing doors and traps and for positively locking them in their opened and closed positions.

Other objects and advantages will appear in the following specification, and the novel features of the device will be particularly pointed out in the appended claims.

Our invention is illustrated in the accompanying drawings forming part of this application, in which similar reference characters denote like parts in the several views and in which—

Figure 1 is a perspective view of the interior of a vestibule showing the door and trap in their closed and locked position; Fig. 2 is a similar view showing the trap as it is being opened, and Fig. 3 is a section along the line 3—3 of Fig. 1.

Referring now particularly to Fig. 1, we have shown therein certain portions of the vestibule which include the floor 1, the end 2 having a doorway 3, the roof 4, and the side 5. Hinged at 6 is a trap 7 which covers the steps 8. The door 9 in the side 5 of the vestibule is hinged at 10. This door is provided with an arc shaped metal bearing plate 11 on its inner side. Secured to the end member 2 of the vestibule is a metal plate 12, and pivotally secured at the upper end of the plate 12 is a lever 13. A shorter lever 14 is pivotally secured at the lower end of the plate 12. At the center of the plate 12 is pivotally secured an operating bar, or handle 15, which is connected by means of the pivoted link 16 to one end of the lever 14. The opposite end of the lever 14 is pivotally connected with the lever 13 by means of the link 17. A flexible cord or cable 18 is secured to the upper part of the door 9, passes over a pulley 19 on the end member 2, and is attached to a spiral spring 20, whose lower end is connected with the lever 13. A link 21 is hooked into a screw eye 22 carried by the trap 7. The upper end of this link is hooked into an opening in the lever 13, the link being provided with a bend $21^a$ for a purpose hereinafter described. The trap 7 is provided with a pivoted roller $7^a$, which is designed to bear on the arc-shaped strip 11.

From the foregoing description of the various parts of the device, the operation thereof may be readily understood. The normal position of the apparatus is that shown in Fig. 1. In this position the door 9 is closed, and since it bears against the trap on its inner side, it is locked as long as the trap covers the steps. When, now, the train arrives at a station, the porter or brakeman, grasps the handle 15 and presses downwardly. This results in bringing the levers 13 and 14, and the links 16 and 17 into the positions shown in full lines in Fig. 2. It will be observed that the outer end of the lever 13 has moved upwardly pulling upward on the link 21, and causing the trap to rise. At the same time the spring 20 is stretched. When the handle 15 is pushed down to the dotted line position, the trap 7 has swung up into the dotted line position shown in Fig. 2. During the movement of the trap, tension has been exerted on the door 9, but it cannot move until the trap has swung out of the way. Friction between the door and the trap is relieved by means of the roller $7^a$. As soon as the trap is out of the way of the door, the latter, under the tension of the spring 20, immediately flies inward against the trap in the position shown in dotted lines in Fig. 2. From the position of the lever 13 shown in dotted lines, it will be evident that there is still tension on the door tending to hold it against the trap. Thus the door and trap are locked since the trap cannot move downwardly until the door has been closed again.

The closing of the door and trap is accomplished by merely taking hold of the door and swinging it shut. As it swings shut tension is exerted on the spring 20 which tends to force the levers into their normal position, and through the medium of the link 21, to force the trap downwardly. The trap cannot move until the door is fully shut, when it springs downwardly into position, thereby setting the operating handle 15 and the levers in their normal position shown in Fig. 1. We have found it necessary to make a bend in the link 21 as shown at 21ª. This bend is sufficient to bring the upper and lower ends of the link out of alinement with the hinges of the trap so that when pressure is exerted on the link the trap will not be dead centered but will be thrown forwardly.

The device herein described serves to operate the door and the trap at a single motion. The door and the trap are locked both in their open and closed positions. The mechanism is out of the way, being close to the end of the vestibule.

We are aware that other devices based on the same general idea might be made, but we consider as our own all such modifications as fairly fall within the spirit and the scope of the invention.

We claim:

1. The combination with a door and trap of a vestibule, of means for opening and closing said door and trap successively and for locking them in position.

2. The combination with a door and trap of a vestibule, of means for operating said door and trap, said means including an operating handle, a series of levers actuated thereby, a spring secured to the end of one of said levers, a flexible connection between said spring and said door, and a link connecting the opposite end of said lever with said trap.

3. The combination with a door and trap of a vestibule, of means for operating said door and trap, said means including an operating handle, a series of levers actuated thereby, a spring secured to the end of one of said levers, a flexible connection between said spring and said door, and a link connecting the opposite end of said lever with said trap, and friction devices for preventing wear between said door and said trap.

JAMES L. MILLER.
JOHN E. HINE.

Witnesses:
WILLIAM E. SCHNEE,
S. A. BASTIAN.